(12) United States Patent
Zhao (10) Patent No.: US 11,483,819 B2
(45) Date of Patent: Oct. 25, 2022

(54) DATA TRANSMISSION METHOD AND APPARATUS AND USER EQUIPMENT

(71) Applicant: BEIJING XIAOMI MOBILE SOFTWARE CO., LTD., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 110 days.

(21) Appl. No.: 16/960,001

(22) PCT Filed: Jan. 4, 2018

(86) PCT No.: PCT/CN2018/071389
§ 371 (c)(1),
(2) Date: Jul. 2, 2020

(87) PCT Pub. No.: WO2019/134098
PCT Pub. Date: Jul. 11, 2019

(65) Prior Publication Data
US 2021/0068084 A1   Mar. 4, 2021

(51) Int. Cl.
*H04W 72/04* (2009.01)
(52) U.S. Cl.
CPC ..... *H04W 72/042* (2013.01); *H04W 72/0446* (2013.01); *H04W 72/0453* (2013.01)
(58) Field of Classification Search
CPC ........... H04W 72/042; H04W 72/0446; H04W 72/0453; H04W 72/044; H04W 72/0413;
(Continued)

(56) References Cited

U.S. PATENT DOCUMENTS

| 5,956,638 A | 9/1999 | Chang |
| 2015/0271798 A1 | 9/2015 | Chen et al. |
| 2019/0230689 A1* | 7/2019 | Cao ........................ H04L 1/0068 |

FOREIGN PATENT DOCUMENTS

| CN | 101931960 A | 12/2010 |
| CN | 105284172 A | 1/2016 |

(Continued)

OTHER PUBLICATIONS

International Search Report to PCT Application No. PCT/CN2018/071389 dated Sep. 21, 2018 with English translation, (4p).
Qualcomm Incorporated, "Discussion and Decision" 3GPP TSG RAN WG1 #91 R1-1721702, Reno, Nevada, Dec. 2017, (17p).
(Continued)

*Primary Examiner* — Dady Chery
(74) *Attorney, Agent, or Firm* — Arch & Lake LLP (57) ABSTRACT

The present disclosure relates to a data transmission method and apparatus and a UE. The method may include: receiving transmission directions of time domain symbols indicated by a base station via SlotFormat indication (SFI) information through a group common PDCCH; determining time-frequency transmission resources on which transmission direction conflict occurs based on the transmission directions of the time domain symbols, the time-frequency transmission resources being time-frequency resources allocated by the base station in an uplink grant free (UL GF) resource period; determining available time-frequency resources configurable to transmit uplink data within the UL GF resource period when the number of the time-frequency transmission resources on which the transmission direction conflict occurs being less than a preset value; and transmitting uplink data on the available time-frequency resources.

12 Claims, 6 Drawing Sheets

(58) Field of Classification Search
CPC ......... H04W 72/1226; H04W 72/1263; H04W 72/1268; H04L 5/0091; H04L 5/0005; H04L 5/0053; H04L 5/0007; H04L 5/0094; H04L 27/2602; H04L 1/00; H04L 5/005; H04L 5/0051; H04L 5/0055; H04L 1/1893; H04L 1/0068; H04L 1/08; H04L 1/1819; H04L 1/189

See application file for complete search history.

(56) References Cited

FOREIGN PATENT DOCUMENTS

| CN | 105934980 A | 9/2016 |
|---|---|---|
| WO | 2016186456 A1 | 11/2016 |

OTHER PUBLICATIONS

CMCC, "Discussion on Scheduling for SPS and UL Waveform Determination", 3GPP TSG RAN WG1 Meeting 90bis R1-1717890, Prague, Czech Republic, Oct. 13, 2017, (6p).

Huawei et al., "Remaining Details on Group-Common PDCCH", 3GPP TSG RAN WG1 Meeting 90bis R1-1717063, Prague, Czech Republic, Oct. 13, 2017, (6p).

CMCC, "Discussion on Scheduling for SPS", 3GPP TSG RAN WG1 Meeting #90 R1-1713849, Prague, Czech Republic, Aug. 25, 2017, (4p).

3GPP TSG RAN WG1 Meeting NR#3 R1-1716059, CMCC, Discussion on scheduling for SPS, Nagoya, Japan, Sep. 18-21, 2017, (4 pages).

First Office Action of the Chinese application No. 201880000021.X, dated Nov. 15, 2021, (9 pages).

\* cited by examiner

Time domain resources to which transmission direction conflict occurs

Available time domain resources

DATA TRANSMISSION METHOD AND APPARATUS AND USER EQUIPMENT

CROSS-REFERENCE TO RELATED APPLICATION

The present application is the U.S. national phase of PCT Application No. PCT/CN2018/071389, filed on Jan. 4, 2018, the contents of which are incorporated hereby in its entirety for all purposes.

TECHNICAL FIELD

The disclosure relates to the technical field of communication, and particularly relates to a data transmission method, a data transmission apparatus and user equipment.

BACKGROUND

In the research and discussion of the 5th generation (5G) mobile communication technology project, in order to support ultra reliable & low latency communication (URLLC), an uplink grant free (UL GF) uplink data transmission solution is proposed for a New Radio (NR) system. In UL GF transmission, the NR supports K (K is a natural number greater than 1) repeated transmissions on the same physical layer transport block in a same GF resource period. The base station may configure user equipment with K time-frequency transmission resources for K repeated transmissions, and configure a channel coding redundancy version used when data are transmitted on each of the time-frequency transmission resources.

In related technologies, in UL GF transmission, if the transmission directions of the time domain symbols where the K time-frequency transmission resources configured by the base station for a user are located are dynamically indicated as downlink (DL) or unknown through SlotFormat indication (SFI) of a group common physical downlink Control channel (group common PDCCH), a conflict may be caused in transmission directions of part of time-frequency transmission resources. Therefore, a new UL GF transmission solution needs to be proposed for data transmission in a GF resource period when there is a conflict between a transmission direction of a time-frequency transmission resource and a transmission direction indicated by a group common PDCCH SFI within the GF resource period.

SUMMARY

In order to address the problem in related technologies, the embodiments of the disclosure provide a data transmission method and apparatus and user equipment (UE). When a transmission direction conflict occurs between a GF uplink transmission and a transmission direction of a time domain symbol indicated by a SFI, the UE may make a reasonable data transmission decision according to the number and positions of conflicting time-frequency resources within the GF resource period, so as to achieve a balance between reliability and latency of the data transmission within the GF resource period.

According to a first aspect of embodiments of the disclosure, a data transmission method is provided and applied to user equipment. The method may include that:

transmission directions of time domain symbols indicated by a base station via SFI information through a group common PDCCH are received;

time-frequency transmission resources on which transmission direction conflict occurs are determined based on the transmission directions of the time domain symbols, wherein the time-frequency transmission resources are time-frequency resources allocated by the base station within a UL GF resource period;

available time-frequency resources configurable to transmit uplink data within the UL GF resource period are determined when the number of the time-frequency transmission resources on which the transmission direction conflict occurs being less than a preset value; and uplink data is transmitted on the available time-frequency resources.

In an embodiment, the method may further include:

uplink data is refused to be transmitted on any one of the time-frequency transmission resources within the UL GF resource period when the number of the time-frequency transmission resources on which the transmission direction conflict occurs being greater than or equal to the preset value.

In an embodiment, the preset value is obtained in any one of the following manners:

receiving the preset value sent through signaling by the base station; or, obtaining the preset value based on the total number of the time-frequency transmission resources within the UL GF resource period and a first ratio; or, obtaining the preset value based on the number of the time-frequency transmission resources used by the user equipment within the UL GF resource period and a second ratio.

In an embodiment, the operation that the available time-frequency resources configurable to transmit uplink data within the UL GF resource period are determined may include:

time-frequency transmission resources available for the first repeated transmission are determined from the time-frequency transmission resources on which no transmission direction conflict occurs within the UL GF resource period; and the time-frequency transmission resources available for the first repeated transmission and the subsequent time-frequency transmission resources on which no transmission direction conflict occurs are determined as the available time-frequency resources.

In an embodiment, the operation that the available time-frequency resources configurable to transmit uplink data within the UL GF resource period are determined may include:

all time-frequency transmission resources on which no transmission direction conflict occurs within the UL GF resource period are determined as the available time-frequency resources.

In an embodiment, the operation that the uplink data is transmitted on the available time-frequency resources may include:

target time-frequency resources for repeated data transmissions are determined from the available time-frequency resources based on the number of retransmissions of a transport block within the UL GF resource period and a configured channel coding redundancy version format; and the transport block is sent on the target time-frequency resources.

According to a second aspect of embodiments of the disclosure, a data transmission apparatus is provided and applied to user equipment. The apparatus may include:

a receiver configured to receive transmission directions of time domain symbols indicated by a base station via SFI information through a group common PDCCH;

a first determination module configured to determine time-frequency transmission resources on which transmission direction conflict occurs based on the transmission directions of the time domain symbols received by the receiver, wherein the time-frequency transmission resources are time-frequency resources allocated by the base station within a UL GF resource period;

a second determination module configured to determine available time-frequency resources configurable to transmit uplink data within the UL GF resource period when the number of the time-frequency transmission resources on which the transmission direction conflict occurs, determined by the first determination module, being less than a preset value; and a transmitter configured to transmit uplink data on the available time-frequency resources determined by the second determination module.

In an embodiment, the apparatus may further include:

a transmission canceling module configured to refuse to transmit uplink data on any one of the time-frequency transmission resources within the UL GF resource period when the number of the time-frequency transmission resources on which the transmission direction conflict occurs being greater than or equal to the preset value.

In an embodiment, the preset value may be obtained in any one of the following manners:

receiving the preset value sent through signaling by the base station; or, obtaining the preset value based on the total number of the time-frequency transmission resources within the UL GF resource period and a first ratio; or, obtaining the preset value based on the number of the time-frequency transmission resources used by the user equipment within the UL GF resource period and a second ratio.

In an embodiment, the second determination module may include:

a first determination sub-module configured to determine time-frequency transmission resources available for the first repeated transmission from the time-frequency transmission resources on which no transmission direction conflict occurs within the UL GF resource period; and a second determination sub-module configured to determine the time-frequency transmission resources available for the first repeated transmission and the subsequent time-frequency transmission resources on which no transmission direction conflict occurs as the available time-frequency resources.

In an embodiment, the second determination module may include:

a third determination sub-module configured to determine all time-frequency transmission resources on which no transmission direction conflict occurs within the UL GF resource period as the available time-frequency resources.

In an embodiment, the transmitter may include:

a fourth determination sub-module configured to determine target time-frequency resources for repeated data transmissions from the available time-frequency resources based on both the number of retransmissions of a transport block within the UL GF resource period and a configured channel coding redundancy version format; and a first sending sub-module configured to send the transport block on the available time-frequency resources from the target time-frequency resources.

According to a third aspect of embodiments of the disclosure, user equipment is provided and may include:

a processor; and a memory configured to store instructions executable by the processor.

The processor is configured to:

receive transmission directions of time domain symbols indicated by a base station via SFI information through a group common PDCCH;

determine time-frequency transmission resources on which transmission direction conflict occurs based on the transmission directions of the time domain symbols, wherein the time-frequency transmission resources are time-frequency resources allocated by the base station within a UL GF resource period;

determine available time-frequency resources configurable to transmit uplink data within the UL GF resource period when the number of the time-frequency transmission resources on which the transmission direction conflict occurs being less than a preset value; and transmit uplink data on the available time-frequency resources.

According to a fourth aspect of embodiments of the disclosure, a non-temporary computer-readable storage medium is provided. The storage medium stores computer instructions thereon. When the instructions are executed by the processor, the following operations are implemented:

transmission directions of time domain symbols indicated by a base station via SFI information through a group common PDCCH are received;

time-frequency transmission resources on which transmission direction conflict occurs are determined based on the transmission directions of the time domain symbols, wherein the time-frequency transmission resources are time-frequency resources allocated by the base station within a UL GF resource period;

available time-frequency resources configurable to transmit uplink data within the UL GF resource period are determined when the number of the time-frequency transmission resources on which the transmission direction conflict occurs being less than a preset value; and the uplink data is transmitted on the available time-frequency resources.

The technical solutions provided by the embodiments of the disclosure have the following beneficial effects.

When user equipment determines that there is conflict between transmission directions of time domain symbols dynamically indicated via a SFI by a base station through a group common PDCCH and transmission directions of UL GF time-frequency transmission resources, the number of transmission time domain resources with conflicting transmission directions can be further determined. When the number of the conflicting transmission time domain resources being less than a preset value, it can be determined that data can be continuously transmitted within a UL GF resource period, and uplink data can be transmitted on available time domain resources which can transmit the uplink data. When the number of the conflicting transmission time domain resources being greater than or equal to the preset value, data transmission within the UL GF resource period may be canceled. Therefore, when the GF uplink transmission conflicts with the transmission directions of the time domain symbols indicated by the SFI, the user equipment can make reasonable data transmission decisions according to the number and positions of the conflicting time-frequency resources within the GF resource period, so as to achieve a balance between reliability and latency of data transmission within the GF resource period.

It is be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementation manners described in the following exemplary embodiments do not represent all implementation manners consistent with the disclosure. On the contrary, they are merely examples of apparatuses and methods consistent with some aspects of the disclosure as detailed in the appended claims.

The technical solutions provided by the disclosure are applicable to a new generation network, such as a 5G network. In order to better support services that require high reliability and low latency, an NR system supports an uplink grant free (UL GF) data transmission solution. User equipment may use semi-statically allocated periodic time-frequency transmission resources to perform UL GF transmission. In UL GF transmission, the NR system can support multiple repeated transmissions of a same physical layer Transport Block (TB) in a same resource period. The number of times of repeated transmissions K is configured through user-specific Radio Resource Control (RRC) signaling. When the number of repeated transmissions is K, a base station may configure the user equipment with K time-frequency transmission resources for K times of repeated transmissions. Furthermore, the base station may configure the user equipment with a channel coding redundancy version (RV) used by each of the K time-frequency transmission resources when data is transmitted through RRC signaling. Corresponding to different RV orders, the user equipment may determine time-frequency transmission resources available for a repeated transmission for first time. In addition, in order to better support the forward compatibility of an NR technology, in an NR system, the transmission direction of a time domain symbol may be defined as uplink (UL), downlink (DL) or unknown/flexible. The NR supports dynamically and flexibly controlling a transmission direction of a time domain symbol by use of an SFI through a group common PDCCH.

Figure 1A:
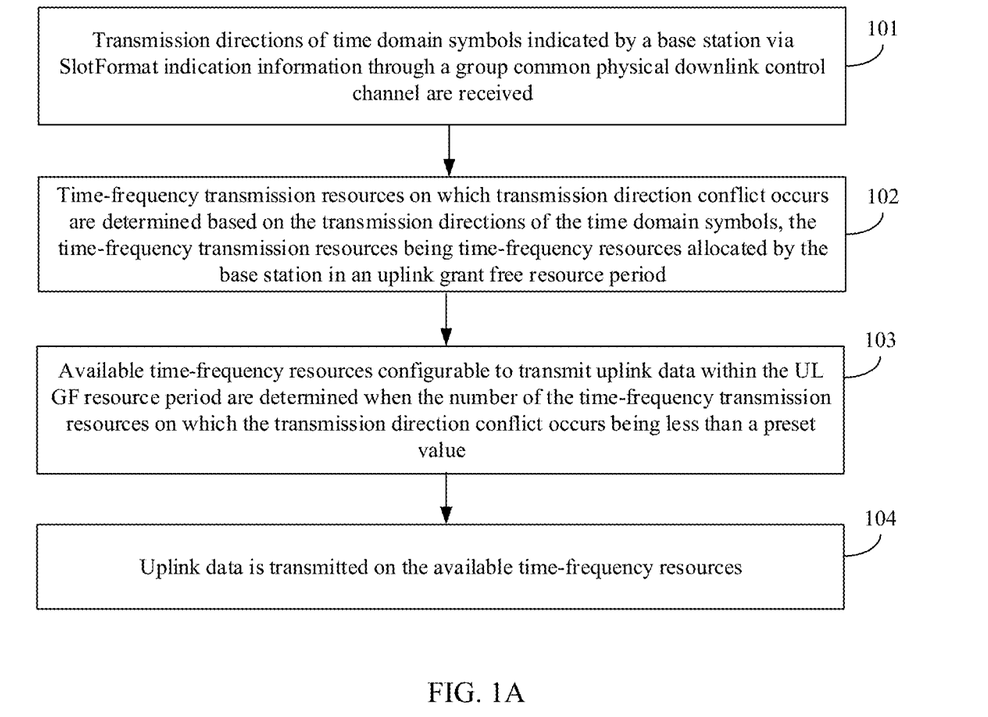
FIG. 1A is a flowchart of a data transmission method according to an exemplary embodiment.
Figure 1B:
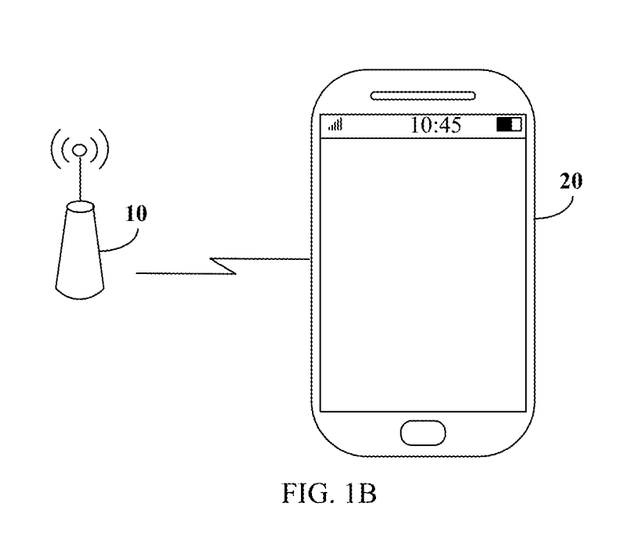
FIG. 1B is a scenario diagram of a data transmission method according to an exemplary embodiment.

FIG. 1A is a flowchart of a data transmission method according to an exemplary embodiment. FIG. 1B is a scenario diagram of a data transmission method according to an exemplary embodiment. The data transmission method may be applied to user equipment. As shown in FIG. 1A, the data transmission method may include the following operations 101 to 104.

In operation 101, transmission directions of time domain symbols indicated by a base station via SFI information through a group common PDCCH are received.

In an embodiment, the transmission directions of the time domain symbols can be dynamically indicated as uplink, or downlink, or unknown through the SFI information carried by the group common PDCCH.

In operation 102, time-frequency transmission resources on which transmission direction conflict occurs are determined based on the transmission directions of the time domain symbols, the time-frequency transmission resources being time-frequency resources allocated by the base station within a UL GF resource period.

In an embodiment, when the base station allocates the time-frequency transmission resources for UL GF transmission to the user equipment, the transmission direction of each of time domain symbols in the time-frequency transmission resources may be semi-statically configured to be uplink through cell-specific RRC signaling or user equipment-specific RRC signaling. Therefore, when the transmission directions of the time domain symbols indicated by the base station through the SFI information are received, the time-frequency transmission resources where the time domain symbols with downlink or unknown transmission directions indicated via SFI information are located may be determined as the time-frequency transmission resources on which the transmission direction conflict occurs.

In operation 103, available time-frequency resources configurable to transmit uplink data within the UL GF resource period are determined when the number of the time-frequency transmission resources on which the transmission direction conflict occurs being less than a preset value.

In an embodiment, the preset value may be a value less than the number of the time-frequency transmission resources within the UL GF resource period. For example, there are 8 time-frequency transmission resources within the UL GF resource period, and the preset value may be 4, 6, and the like.

In an embodiment, the preset value may be obtained in any one of the following three manners.

Manner 1: The preset value sent by a base station through signaling is received.

In an embodiment, the base station may send the preset value to the user equipment through downlink signaling, such as RRC signaling, or physical layer signaling, or an MAC Control Element (CE).

In an embodiment, in addition to obtaining the preset value based on the downlink signaling of the base station, the user equipment may also determine the preset value based on a system protocol. For example, the system protocol may predetermine the preset value to be 2.

Manner 2: Obtaining the preset value based on a total number of the time-frequency transmission resources within the UL GF resource period and a first ratio.

In an embodiment, the preset value may be obtained by calculating the product of the total number of the time-frequency transmission resources within the UL GF resource period and the first ratio. For example, when the total number of the time-frequency transmission resources within the UL GF resource period is 8 and the first ratio is 0.5, the preset value is 4.

Manner 3: Obtaining the preset value based on the number of the time-frequency transmission resources used by the user equipment within the UL GF resource period and a second ratio.

In an embodiment, the preset value may be obtained by calculating the product of the number of the time-frequency transmission resources used by the user equipment within the UL GF resource period and the second ratio. For example, the total number of the time-frequency transmission resources within the UL GF resource period is 8, but the user equipment is ready to perform the first repeated transmission at the position of the third time-frequency transmission resource, it may be determined that the number of the time-frequency transmission resources used by the user equipment is 6; and if the second ratio is 0.5, the preset value is 3.

In an embodiment, when the number of the time-frequency transmission resources on which the transmission direction conflict occurs is less than the preset value, it may be understood that the number of conflicting time-frequency transmission resources within the UL GF resource period is relatively small, and the impact on the reliability of data transmission is not particularly large. Therefore, in order to reduce the latency, the uplink data may be continuously transmitted within the UL GF resource period, so it is needed to determine available time-frequency resources. The method for determining the available time-frequency resources may refer to the embodiments shown in FIG. 2A and FIG. 3A, and is not described in detail here.

In operation 104, the uplink data is transmitted on the available time-frequency resources.

In an embodiment, the available time-frequency resources may be understood as the time-frequency resources that the user equipment may transmit uplink data within the UL GF resource period, and the user equipment may select time-frequency resources from the available time-frequency resources to perform data transmission. The method for transmitting uplink data on the available time-frequency resources may refer to the embodiment shown in FIG. 4, and is not described in detail here.

In an exemplary scenario, as shown in FIG. 1B, a mobile network is taken as a new generation network for example, such as a 5G network, and a gNB is taken as a base station for exemplary description. The scenario shown in FIG. 1B includes gNB10 and UE20. The gNB10 may indicate a transmission direction of each of the time domain symbols via SFI information through a group common PDCCH. When the indicated transmission direction of the time domain symbol conflicts with a transmission direction of time-frequency resources within a GF resource period of the UE20, the UE 20 may make a reasonable data transmission decision based on the number and positions of the conflicting time-frequency resources.

In the embodiment, based on the above operations 101 to 104, when the GF uplink transmission conflicts with the transmission direction of the time domain symbols indicated by the SFI, the user equipment may make a reasonable data transmission decision according to the number and positions of the conflicting time-frequency resources within the GF resource period, so as to achieve a balance between reliability and latency of data transmission within the GF resource period.

The technical solutions provided by the embodiments of the disclosure are described below with specific embodiments.

Figure 2A:
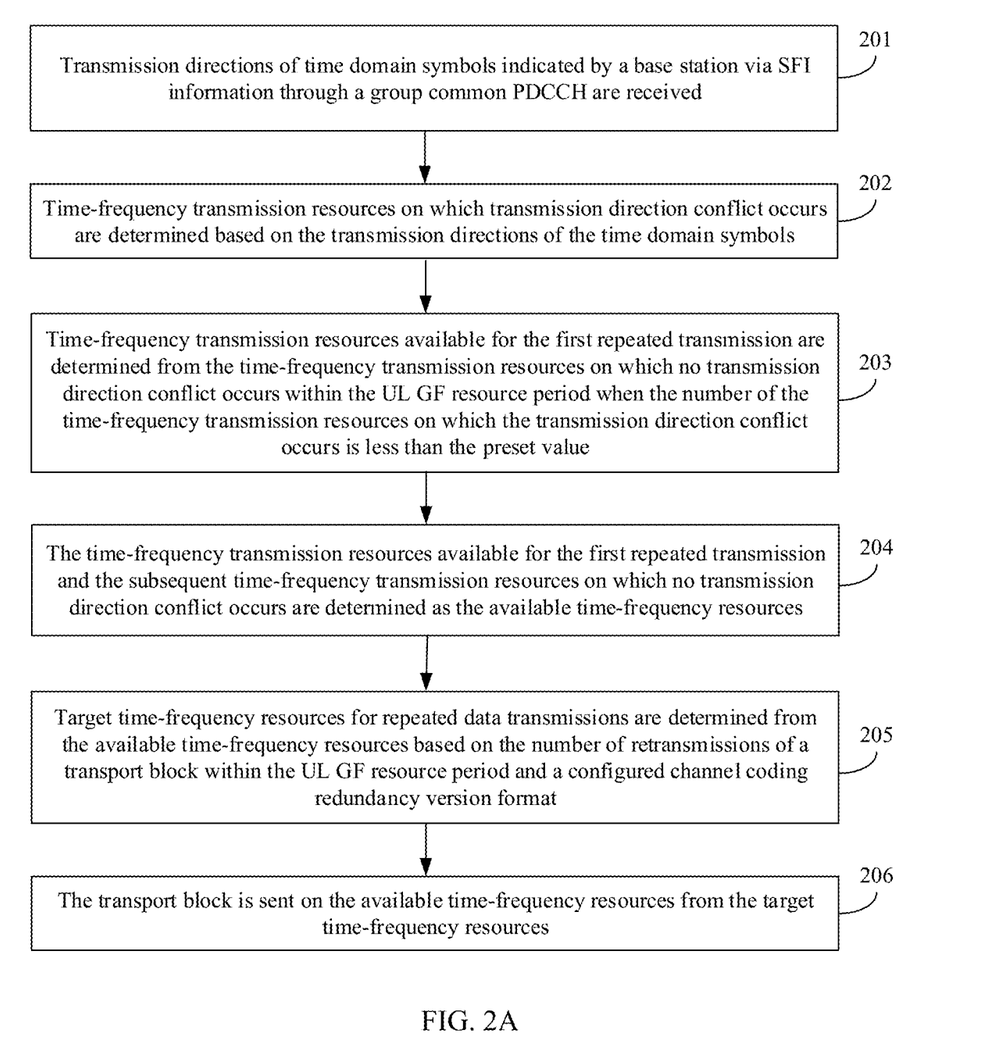
FIG. 2A is a flowchart of another data transmission method according to an exemplary embodiment.
Figure 2B:
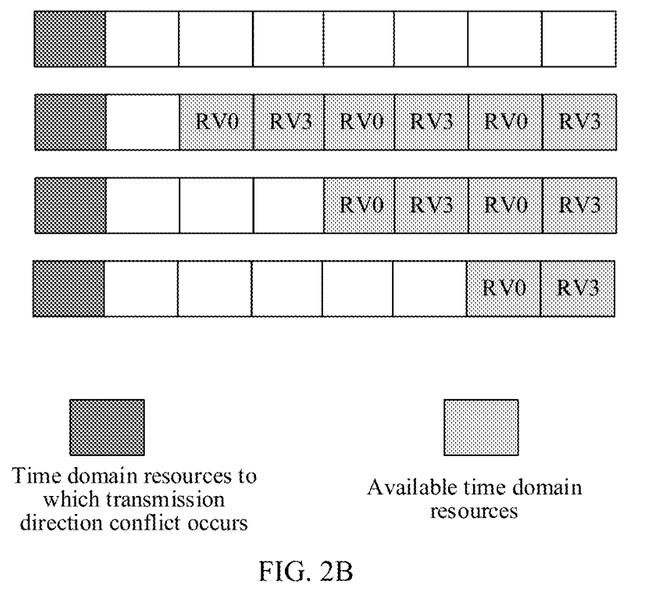
FIG. 2B is schematic diagram I of data transmission according to an exemplary embodiment.
Figure 2C:
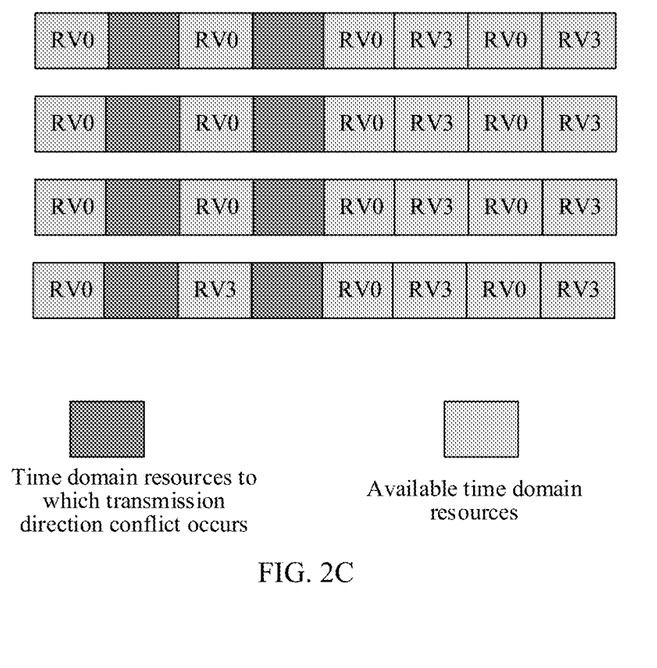
FIG. 2C is schematic diagram II of data transmission according to an exemplary embodiment.

FIG. 2A is a flowchart of another data transmission method according to an exemplary embodiment. FIG. 2B is schematic diagram I of data transmission according to an exemplary embodiment. FIG. 2C is schematic diagram II of data transmission according to an exemplary embodiment. The embodiment uses the above method provided by the embodiments of the disclosure as an example to illustrate how the user equipment determines the available time-frequency resources and how to send data on the available time-frequency resources. As shown in FIG. 2A, the method may include the following operations:

In operation 201, transmission directions of time domain symbols indicated by a base station via SFI information through a group common PDCCH are received.

In operation 202, time-frequency transmission resources on which transmission direction conflict occurs are determined based on the transmission directions of the time domain symbols, and the operation 203 is performed.

In an embodiment, the time-frequency transmission resources are time-frequency resources allocated by the base station within a UL GF resource period.

In an embodiment, the descriptions of the operation 201 and the operation 202 may refer to the descriptions of the operation 101 and the operation 102 in the embodiment shown in FIG. 1A, and details are not described here.

In operation 203, time-frequency transmission resources available for the first repeated transmission are determined from the time-frequency transmission resources on which no transmission direction conflict occurs within the UL GF resource period when the number of the time-frequency transmission resources on which the transmission direction conflict occurs is less than the preset value.

In an embodiment, FIG. 2B illustrates a resource period including 8 time-frequency transmission resources. Assuming that the RV order is "0, 3, 0, 3", the positions of the time-frequency resources available for the first repeated transmission may be the first, third, fifth and seventh time-frequency resources. When time-frequency transmission resources on which transmission direction conflict occurs do not include the first, third, fifth and seventh time-frequency resources within the resource period, and it is assumed that the time-frequency transmission resource on which transmission direction conflict occurs is the first time-frequency resource, the user equipment may determine a time-frequency resource available for the first repeated transmission from the time-frequency transmission resources to which no conflict occurs, that is, from the second to eighth time-frequency transmission resources. For example, when the RV order is "0, 3, 0, 3", it may be determined that the first time-frequency transmission resource available for the first repeated transmission is the third, fifth and seventh time-frequency resources. Assuming that the time-frequency transmission resource on which transmission direction conflict occurs is the third time-frequency resource, the user equipment may determine the first, fifth and seventh time-frequency resources as the time-frequency transmission resources available for the first repeated transmission from the time-frequency transmission resources to which no conflict occurs, that is, from the first to second and the fourth to eighth time-frequency transmission resources.

In an embodiment, referring to FIG. 2C, assuming that the RV order is "0, 3, 0, 3", the time-frequency resources available for the first repeated transmission are the first, third, fifth and seventh time-frequency resources. When the time-frequency transmission resources on which the transmission direction conflict occurs do not include the first, third, fifth or seventh time-frequency resources within a resource period and the time-frequency resources on which transmission direction conflict occurs are the second and fourth time-frequency resources, all time-frequency transmission resources on which no transmission direction conflict occurs, that is, the first, third, fifth, sixth, seventh and eighth time-frequency resources, may be determined as available time-frequency transmission resources, and the user equipment may determine the first, third, fifth and seventh time-frequency resources as the time-frequency resources for the first repeated transmission.

In operation 204, the time-frequency transmission resources available for the first repeated transmission and the subsequent time-frequency transmission resources on which no transmission direction conflict occurs are determined as the available time-frequency resources.

In an embodiment, when the time-frequency transmission resources on which the transmission direction conflict occurs include the first time-frequency resource within a resource period, the time-frequency resource between the first time-frequency resource and the first time-frequency transmission resource available for the first repeated transmission is an unavailable time-frequency resource. For example, in FIG. 2B, the time-frequency transmission resource on which transmission direction conflict occurs is the first time-frequency resource, and the time-frequency resources available for the first repeated transmission by the user are the third, fifth and seventh time-frequency resources. Although no transmission direction conflict occurs to the second time-frequency resource, the second time-frequency resource cannot be used as an available time-frequency transmission resource, and the available time-frequency transmission resources can only be the third to sixth time-frequency resources.

In operation 205, target time-frequency resources for repeated data transmissions are determined from the available time-frequency resources based on the number of retransmissions of a transport block within the UL GF resource period and a configured channel coding redundancy version format.

In an embodiment, the channel coding redundancy version format may be configured by the base station for the user equipment through RRC signaling. In UL GF transmission, three possible channel coding redundancy version formats are defined: "0, 2, 3, 1", "0, 3, 0, 3" or "0, 0, 0, 0". Here, the channel coding redundancy version format (RV order) is "0, 3, 0, 3" to describe how to determine the target time-frequency resources from the available time-frequency resources. Referring to FIG. 2B, assuming that the user equipment determines to perform four repeated transmissions within a resource period and the RV order is "0, 3, 0, 3", it is needed to determine the fifth to eighth time domain units as the target time-frequency resources.

In operation 206, the transport block is sent on the target time-frequency resources.

In the embodiment, when determining that the GF uplink transmission conflicts with the transmission directions of the time domain symbols indicated by the SFI, the user equipment may make a reasonable data transmission decision according to the number and positions of the conflicting time-frequency resources within a GF resource period, and perform different transmission decisions based on whether the time domain resources on which transmission direction conflict occurs include the first time domain resource, thereby ensuring a balance between reliability and latency of data transmission within a GF resource period to the greatest extent.

Figure 3A:
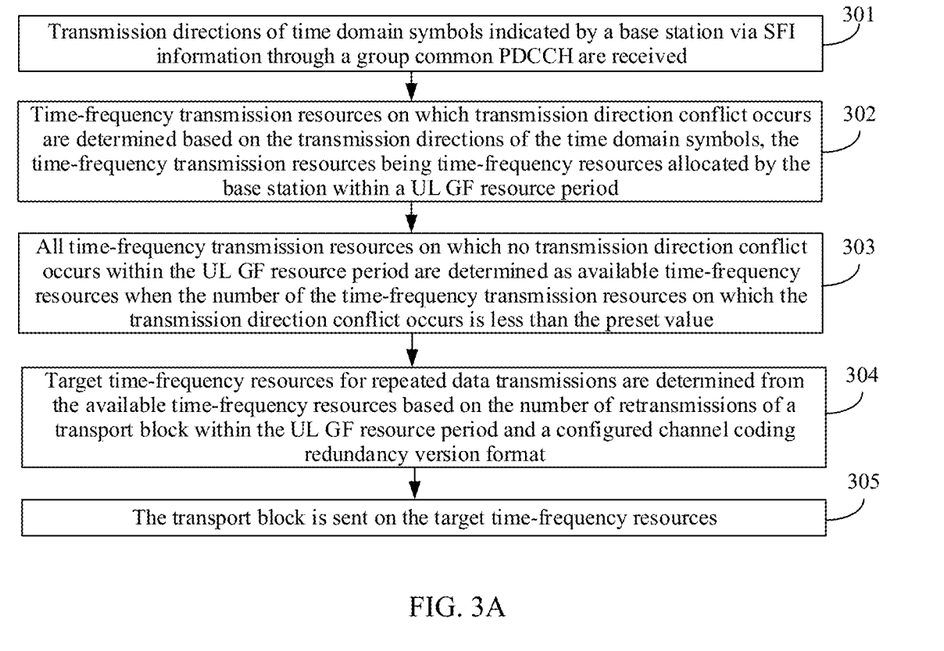
FIG. 3A is a flowchart of another data transmission method according to an exemplary embodiment.
Figure 3B:
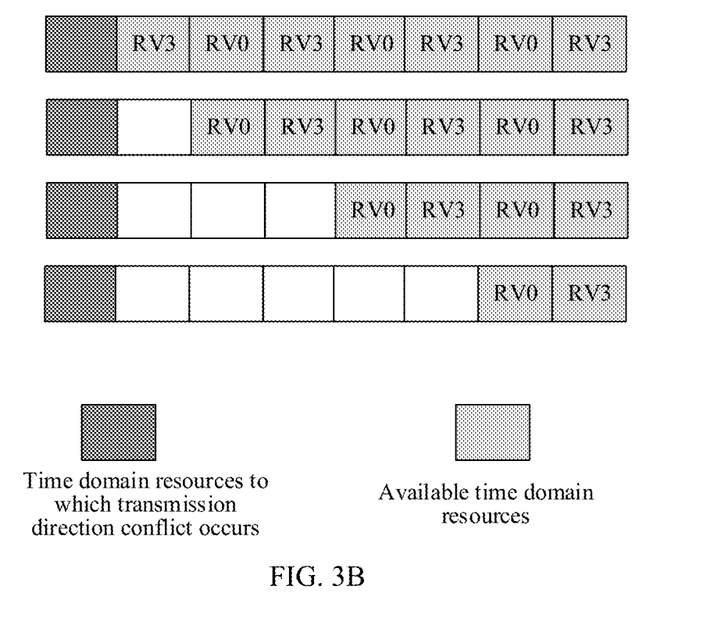
FIG. 3B is a schematic diagram III of data transmission according to an exemplary embodiment.

FIG. 3A is a flowchart of another data transmission method according to an exemplary embodiment. FIG. 3B is a schematic diagram III of data transmission according to an exemplary embodiment. The present embodiment uses the above method provided by the embodiments of the disclosure as an example to illustrate how the user equipment determines the available time-frequency resources and how to send data on the available time-frequency resources. As shown in FIG. 3A, the method may include the following operations:

In operation 301, transmission directions of time domain symbols indicated by a base station via SFI information through a group common PDCCH are received.

In operation 302, time-frequency transmission resources on which transmission direction conflict occurs are determined based on the transmission directions of the time domain symbols, the time-frequency transmission resources being time-frequency resources allocated by the base station within a UL GF resource period.

In an embodiment, the descriptions of the operation 301 and the operation 302 may refer to the descriptions of the operation 101 and the operation 102 in the embodiment shown in FIG. 1A, and details are not described here.

In operation 303, all time-frequency transmission resources on which no transmission direction conflict occurs within the UL GF resource period are determined as available time-frequency resources when the number of the time-frequency transmission resources on which the transmission direction conflict occurs is less than the preset value.

In an embodiment, FIG. 3B illustrates a resource period including 8 time-frequency transmission resources. When the time-frequency transmission resource on which transmission direction conflict occurs is the first time-frequency resource, the user equipment may determine the time-frequency transmission resources to which no conflict occurs, that is, the second to eighth time-frequency resources, as the available time-frequency resources. For example, when the RV order is "0, 3, 0, 3", the user equipment may transmit the uplink data in an RV3 format on the second time-frequency resource. When the time-frequency transmission resource on which transmission direction conflict occurs is the third time-frequency resource, the user equipment may determine the time-frequency transmission resources to which no conflict occurs, that is, the first to second and the fourth to eighth time-frequency transmission resources, as the available time-frequency resources.

In operation 304, target time-frequency resources for repeated data transmissions are determined from the available time-frequency resources based on the number of retransmissions of a transport block within the UL GF resource period and a configured channel coding redundancy version format.

In an embodiment, since all time-frequency resources on which no transmission direction conflict occurs may be used as the available time-frequency resources, a target time-frequency resource can be determined based on the number of retransmissions of the transport block within a UL GF resource period and the configured channel coding redundancy version format. Referring to FIG. 3B, when the user equipment is to retransmit the transport block for 8 times within a UL GF resource period, it is needed to transmit data starting from the first time-frequency resource, the first time-frequency resource being the time-frequency resource on which transmission direction conflict occurs, and then, the second to eighth time-frequency resources may be used as the target time-frequency resources. However, when the RV order is "0, 3, 0, 3", the data coding format transmitted by the second time-frequency resource is the second repeated transmission, and the first repeated transmission occurs on the first time domain resource, so that the transmission is canceled due to the conflict of the transmission directions.

In operation 305, the transport block is sent on the target time-frequency resources.

The embodiment provides an implementation manner as follows: when determining that a GF uplink transmission conflicts with a transmission direction of a time domain symbol indicated by a SFI and the number of the conflicting time-frequency resources being less than a preset value, all time-frequency resources to which no conflict occurs may be used as available time-frequency resources, thereby ensuring a balance between reliability and latency of data transmission within a GF resource period to the greatest extent.

Figure 4:
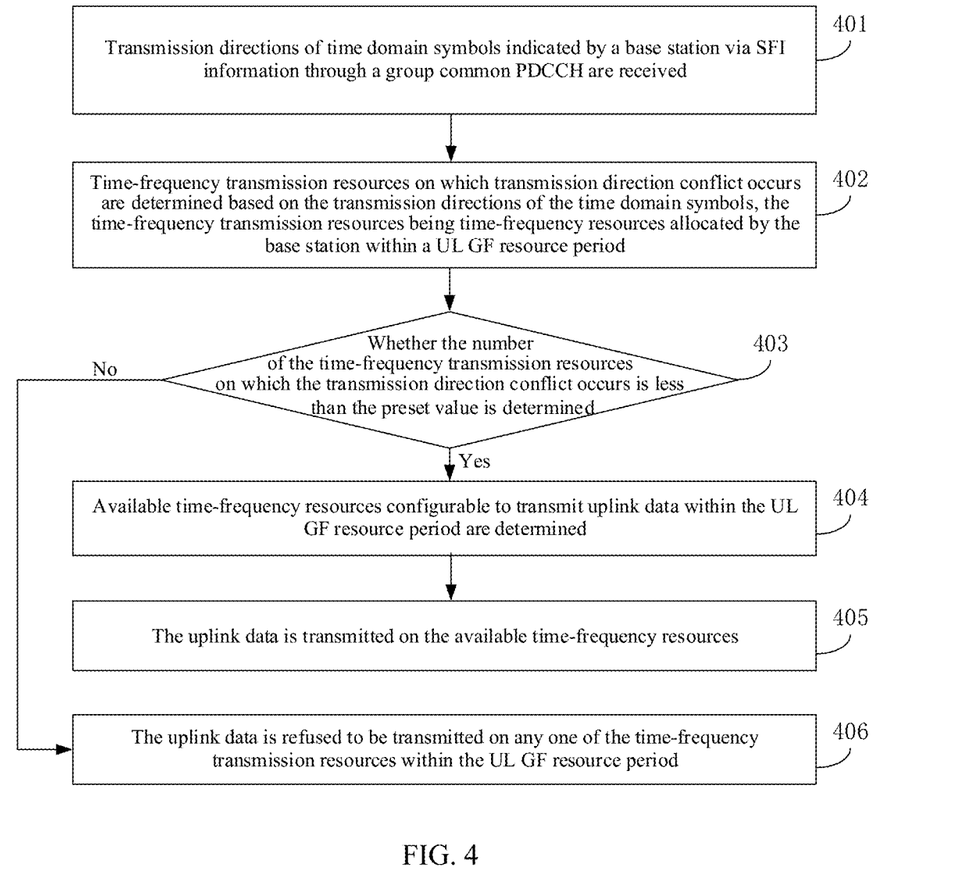
FIG. 4 is a flowchart of another data transmission method according to an exemplary embodiment.

FIG. 4 is a flowchart of another data transmission method according to an exemplary embodiment. The present embodiment uses the above method provided by the embodiments of the disclosure as an example to illustrate how the user equipment determines whether to perform data transmission in a resource period based on the number of the time-frequency resources on which transmission direction conflict occurs. As shown in FIG. 4, the method may include the following operations:

In operation 401, transmission directions of time domain symbols indicated by a base station via SFI information through a group common PDCCH are received.

In operation 402, time-frequency transmission resources on which transmission direction conflict occurs are determined based on the transmission directions of the time domain symbols, the time-frequency transmission resources being time-frequency resources allocated by the base station within a UL GF resource period.

In an embodiment, the descriptions of the operation 401 and the operation 402 may refer to the descriptions of the operation 101 and the operation 102 in the embodiment shown in FIG. 1A, and details are not described here.

In operation 403, whether the number of the time-frequency transmission resources on which the transmission direction conflict occurs is less than the preset value is determined; when the number is less than the preset value, the operation 404 is performed, and otherwise, when the number being greater than or equal to the preset value, the operation 406 is performed.

In an embodiment, the preset value may be a value less than the number of the time-frequency transmission resources within the UL GF resource period. For example, there are 8 time-frequency transmission resources within the UL GF resource period, and the preset value may be 4, 6, and the like. The determination manner of the preset value may refer to the description of the operation 103 in the embodiment shown in FIG. 1A, and details are not described here.

In operation 404, available time-frequency resources configurable to transmit uplink data within the UL GF resource period are determined.

In an embodiment, the description of the operation 404 may refer to the description of the operation 104 in the embodiment shown in FIG. 1A, and details are not described here.

In operation 405, the uplink data is transmitted on the available time-frequency resources.

In operation 406, the uplink data is refused to be transmitted on any one of the time-frequency transmission resources within the UL GF resource period.

In an embodiment, when the number of the time-frequency transmission resources on which the transmission direction conflict occurs being greater than or equal to the preset value, it may be understood that the number of conflicting time-frequency transmission resources within the UL GF resource period is relatively large, and the impact on the reliability of data transmission is particularly large. Therefore, in order to increase the reliability of data transmission, it is needed to cancel the transmission of uplink data within a UL GF resource period.

The embodiment provides an implementation manner for determining whether to perform data transmission within a UL GF resource period based on the number of time-frequency resources on which transmission direction conflict occurs. When the number of time-frequency transmission resources on which the transmission direction conflict occurs is greater than or equal to a preset value, it may be understood that the number of conflicting time-frequency transmission resources within the UL GF resource period is relatively large, and the impact on the reliability of data transmission is particularly large. Therefore, in order to increase the reliability of data transmission, it is needed to cancel the transmission of uplink data within the UL GF resource period. When the number of the time-frequency transmission resources on which the transmission direction conflict occurs is less than the preset value, it may be understood that the number of conflicting time-frequency transmission resources within the UL GF resource period is relatively small, and the impact on the reliability of data transmission is not large. Therefore, in order to reduce the latency, the uplink data can be continuously transmitted within the UL GF resource period, so that a balance between reliability and latency of data transmission within the GF resource period can be achieved.

Figure 5:
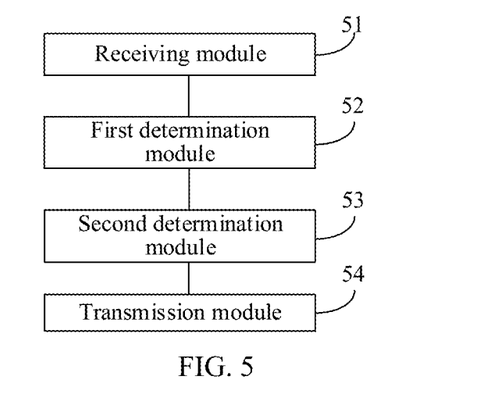
FIG. 5 is a block diagram of a data transmission apparatus according to an exemplary embodiment.

FIG. 5 is a block diagram of a data transmission apparatus according to an exemplary embodiment. The data transmission apparatus is applied to user equipment. As shown in FIG. 5, the data transmission apparatus may include:

a receiver 51 configured to receive transmission directions of time domain symbols indicated by a base station via SFI information through a group common PDCCH;

a first determination module 52 configured to determine time-frequency transmission resources on which transmission direction conflict occurs based on the transmission directions of the time domain symbols received by the receiver 51, wherein the time-frequency transmission resources are time-frequency resources allocated by the base station within a UL GF resource period;

a second determination module 53 configured to determine available time-frequency resources configurable to transmit uplink data within the UL GF resource period when the number of the time-frequency transmission resources on which the transmission direction conflict occurs, determined by the first determination module 52, being less than a preset value; and a transmitter 54 configured to transmit uplink data on the available time-frequency resources determined by the second determination module 53.

Figure 6:
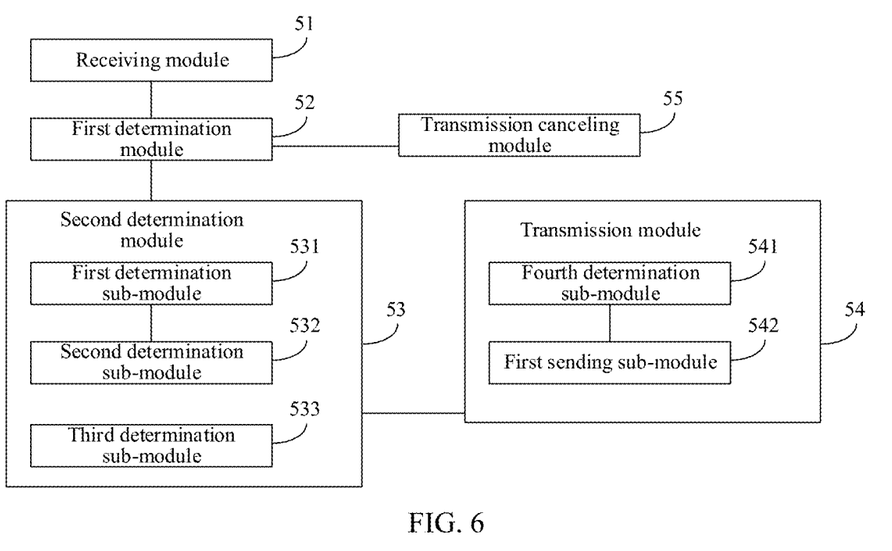
FIG. 6 is a block diagram of another data transmission apparatus according to an exemplary embodiment.

FIG. 6 is a block diagram of an apparatus applicable to data transmission according to an exemplary embodiment. As shown in FIG. 6, on the basis of the embodiment shown in FIG. 5, in an embodiment, the apparatus further may include:

a transmission canceling module 55 configured to refuse to transmit uplink data on any one of the time-frequency transmission resources within the UL GF resource period when the number of the time-frequency transmission resources on which the transmission direction conflict occurs being greater than or equal to the preset value.

In an embodiment, the preset value is obtained in any one of the following manners:

receiving the preset value sent through signaling by the base station; or, obtaining the preset value based on the total number of the time-frequency transmission resources within the UL GF resource period and a first ratio; or, obtaining the preset value based on the number of the time-frequency transmission resources used by the user equipment within the UL GF resource period and a second ratio.

In an embodiment, the second determination module 53 may include:

a first determination sub-module 531 configured to determine time-frequency transmission resources available for the first repeated transmission from the time-frequency transmission resources on which no transmission direction conflict occurs within the UL GF resource period; and a second determination sub-module 532 configured to determine the time-frequency transmission resources available for the first repeated transmission and the subsequent time-frequency transmission resources on which no transmission direction conflict occurs as the available time-frequency resources.

In an embodiment, the second determination module 53 may include:

a third determination sub-module 533 configured to determine all time-frequency transmission resources on which no transmission direction conflict occurs within the UL GF resource period as the available time-frequency resources.

In an embodiment, the transmitter 54 may include:

a fourth determination sub-module 541 configured to determine target time-frequency resources for repeated data transmissions from the available time-frequency resources based on the number of retransmissions of a transport block within the UL GF resource period and a configured channel coding redundancy version format; and a first sending sub-module 542 configured to send the transport block on the available time-frequency resources from the target time-frequency resources.

With respect to the apparatus in the above embodiment, the specific manners for performing operations for individual modules therein have been described in detail in the embodiment regarding the method, which will not be elaborated herein.

Figure 7:
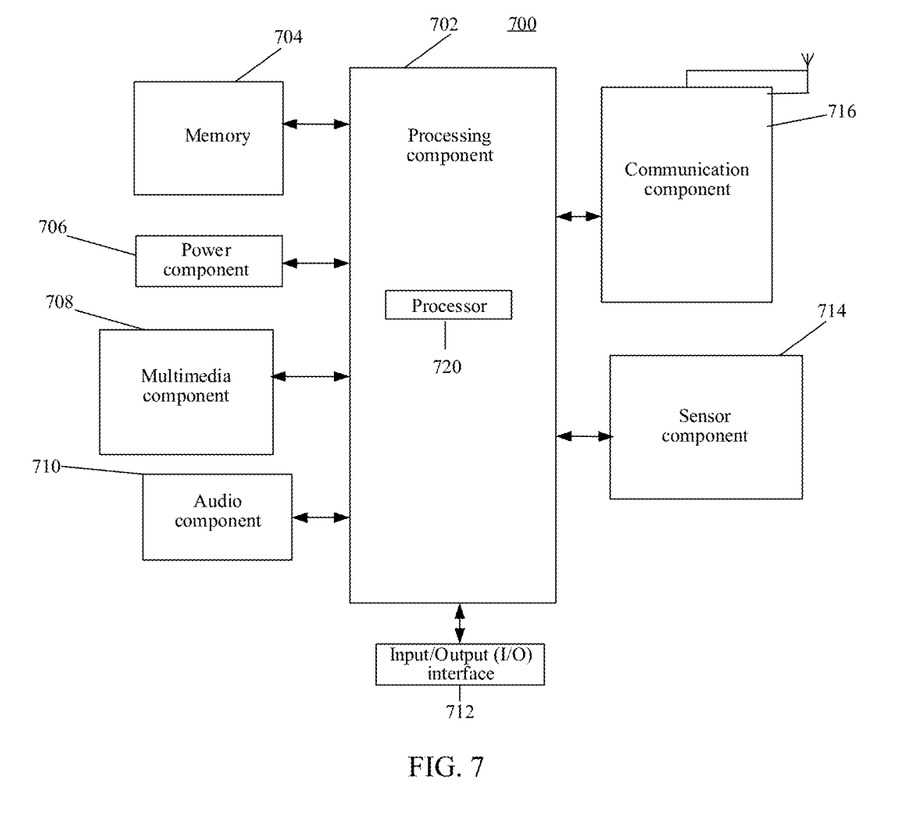
FIG. 7 is a block diagram of an apparatus applicable to data transmission according to an exemplary embodiment.

FIG. 7 is a block diagram of an apparatus applicable to data transmission according to an exemplary embodiment. For example, the apparatus 700 may be user equipment such as a mobile phone, a computer, a digital broadcasting terminal, messaging equipment, a game console, tablet equipment, medical equipment, fitness equipment, and a personal digital assistant. The apparatus 700 may be a receiving end or a sending end.

Referring to FIG. 7, the apparatus 700 may include one or a plurality of following components: a processing component 702, a memory 704, a power component 706, a multimedia component 708, an audio component 712, an Input/Output (I/O) interface 712, a sensor component 714, and a communication component 716.

The processing component 702 is generally configured to control overall operations of the apparatus 700, such as operations related to displaying, telephone calls, data communications, camera operations, and recording operations. The processing component 702 may include one or more processors 720 to execute instructions, so as to complete all or part of the operations of the method described above. In addition, the processing component 702 may include one or more modules to facilitate the interaction between the processing component 702 and other components. For example, the processing component 702 may include a multimedia module to facilitate interaction between the multimedia component 708 and the processing component 702.

The memory 704 is configured to store various types of data to support the operation of the apparatus 700. Examples of such data may include instructions for any applications or methods operated on the apparatus 700, contact data, phonebook data, messages, pictures, videos, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 is configured to provide power to various components of the apparatus 700. The power component 706 may include a power management system, one or more power sources, and any other components associated with the generation, management and distribution of power in the apparatus 700.

The multimedia component 708 may include a screen providing an output interface between the apparatus 700 and a user. In some embodiments, the screen may include a Liquid Crystal Display (LCD) and a touch panel (TP). If the screen includes the TP, the screen may be implemented as a touch screen to receive an input signal from the user. The TP may include one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 708 may include a front camera and/or a rear camera. The front camera and the rear camera may receive external multimedia data while the apparatus 700 is in an operation mode, such as a photographing mode or a video mode. Each front camera and each rear camera may be fixed optical lens systems or may have focal lengths and optical zoom capabilities.

The audio component 712 is configured to output and/or input audio signals. For example, the audio component 712 may include a microphone (MIC), and the microphone is configured to receive external audio signals when the apparatus 700 is in an operation mode, such as a calling mode, a recording mode, and a voice identification mode. The received audio signals may be further stored in the memory 704 or transmitted via the communication component 716. In some embodiments, the audio component 712 may further include a speaker to output audio signals.

The I/O interface 712 provides an interface between the processing component 702 and a peripheral interface module. The peripheral interface module may be a keyboard, a click wheel, a button, and the like. These buttons may include, but not limited to: a home button, a volume button, a start button, and a lock button.

The sensor component 714 may include one or more sensors configured to provide various aspects of state assessment for the apparatus 700. For example, the sensor component 714 may detect an on/off status of the apparatus 700, and relative positioning of components. For example, the component is a display and a keypad of the apparatus 700. The sensor component 714 may also detect a change in position of the apparatus 700 or a component of the apparatus 700, presence or absence of a user contact with the apparatus 700, an orientation or an acceleration/deceleration of the apparatus 700, and a change in temperature of the apparatus 700. The sensor component 714 may include a proximity sensor configured to detect the presence of objects nearby without any physical contact. The sensor component 714 may also include light sensors, such as CMOS or CCD image sensors, for use in imaging applications. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard, such as WiFi, 2G or 6G, or a combination thereof. In an exemplary embodiment, the communication component 716 receives a broadcast signal or broadcast related information from an external broadcast management system via a broadcast channel. In an exemplary embodiment, the communication component 716 further may include a Near Field Communication (NFC) module to promote short-range communications. For example, the NFC module may be implemented based on a Radio Frequency Identification (RFID) technology, an Infrared Data Association (IrDA), an Ultra-Wide Band (UWB) technology, a Bluetooth (BT) technology and other technologies.

In an exemplary embodiment, the apparatus 700 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the method described in the first aspect.

In an exemplary embodiment, there is also provided a non-transitory computer-readable storage medium including instructions, such as a memory 704 including instructions. When the above instructions are executed, the processor 720 of the apparatus 700 may be configured to perform the method described in the first aspect.

Other embodiments of the disclosure will readily occur to those skilled in the art upon consideration of the specification and practice of the disclosure disclosed herein. The disclosure is intended to cover any variations, uses, or adaptive changes of the disclosure. These variations, uses, or adaptive changes follow the general principles of the disclosure and include common general knowledge or conventional technical means in the technical field, which are not disclosed herein. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for data transmission, applied to user equipment, the method comprising:
   receiving transmission directions of time domain symbols, wherein the transmission directions of the time domain symbols are indicated by a base station via SlotFormat indication (SFI) information through a group common Physical Downlink Control Channel (group common PDCCH);
   determining, based on the transmission directions of the time domain symbols, time-frequency transmission resources on which transmission direction conflict occurs, wherein the time-frequency transmission resources are time-frequency resources allocated by the base station within an uplink grant free (UL GF) resource period;
   determining available time-frequency resources configurable to transmit uplink data within the UL GF resource period when the number of the time-frequency transmission resources on which the transmission direction conflict occurs being less than a preset value;
   transmitting uplink data on the available time-frequency resources; refusing to transmit uplink data on any one of the time-frequency transmission resources within the UL GF resource period when the number of the time-frequency transmission resources on which the transmission direction conflict occurs being greater than or equal to the preset value.

2. The method of claim 1, wherein the preset value is obtained in any one of following manners: receiving the preset value sent through signaling by the base station; or, obtaining the preset value based on a total number of the time-frequency transmission resources within the UL GF resource period and a first ratio; or, obtaining the preset value based on the number of time-frequency transmission resources used by the user equipment within the UL GF resource period and a second ratio.

3. The method of claim 1, wherein determining the available time-frequency resources configurable to transmit uplink data within the UL GF resource period comprises:
   determining time-frequency transmission resources available for a first repeated transmission from time-frequency transmission resources on which no transmission direction conflict occurs within the UL GF resource period; and determining the time-frequency transmission resources available for the first repeated transmission and subsequent time-frequency transmission resources on which no transmission direction conflict occurs as the available time-frequency resources.

4. The method of claim 1, wherein determining the available time-frequency resources configurable to transmit uplink data within the UL GF resource period comprises:
   determining all time-frequency transmission resources on which no transmission direction conflict occurs within the UL GF resource period as the available time-frequency resources.

5. The method of claim 1, wherein transmitting uplink data on the available time-frequency resources comprises: determining target time-frequency resources for repeated data transmissions from the available time-frequency resources based on both the number of retransmissions of a transport block within the UL GF resource period and a configured channel coding redundancy version format; and sending the transport block on the target time-frequency resources.

6. An apparatus for data transmission, applied to user equipment, comprising: a receiving module configured to receive transmission directions of time domain symbols, wherein the transmission directions of the time domain symbols are indicated by a base station via SlotFormat indication (SFI) information through a group common physical downlink control channel (group common PDCCH); a first determination module, configured to determine, based on the transmission directions of the time domain symbols received by the receiving module, time-frequency transmission resources on which transmission direction conflict occurs, wherein the time-frequency transmission resources are time-frequency resources allocated by the base station in an uplink grant free (UL GF) resource period; a second determination module, configured to determine available time-frequency resources configurable to transmit uplink data within the UL GF resource period when the number of the time-frequency transmission resources on which the transmission direction conflict occurs, determined by the first determination module, being less than a preset value; and a transmission module, configured to transmit uplink data on the available time-frequency resources determined by the second determination module, and a transmission canceling module, configured to refuse to transmit uplink data on any one of the time-frequency transmission resources within the UL GF resource period when the number of the time-frequency transmission resources on which the transmission direction conflict occurs being greater than or equal to the present value.

7. The apparatus of claim 6, wherein the preset value is obtained in any one of following manners: receiving the preset value sent through signaling by the base station; or, obtaining the preset value based on a total number of the time-frequency transmission resources within the UL GF resource period and a first ratio; or, obtaining the preset value based on the number of time-frequency transmission resources used by the user equipment within the UL GF resource period and a second ratio.

8. The apparatus of claim 6, wherein the second determination module comprises: a first determination sub-module, configured to determine time-frequency transmission resources available for a first repeated transmission from time-frequency transmission resources on which no transmission direction conflict occurs within the UL GF resource period; and a second determination sub-module, configured to determine the time-frequency transmission resources available for the first repeated transmission and subsequent time-frequency transmission resources on which no transmission direction conflict occurs as the available time-frequency resources.

9. The apparatus of claim 6, wherein the second determination module comprises: a third determination sub-module configured to determine all time-frequency transmission resources on which no transmission direction conflict occurs within the UL OF resource period as the available time-frequency resources.

10. The apparatus of claim 6, wherein the transmission module comprises: a fourth determination sub-module, configured to determine target time-frequency resources for repeated data transmissions from the available time-frequency resources based on both the number of retransmissions of a transport block within the UL OF resource period and a configured channel coding redundancy version format; and a first sending sub-module, configured to send the transport block on the target time-frequency resources.

11. User equipment, comprising: a processor, and a memory configured to store instructions executable by the processor, wherein the processor is configured to: receive transmission directions of time domain symbols, wherein the transmission directions of the time domain symbols are indicated via SlotFormat indication (SFI) information by a base station through a group common physical downlink control channel (group common PDCCH); determine, based on the transmission directions of the time domain symbols, time-frequency transmission resources on which transmission direction conflict occurs, wherein the time-frequency transmission resources are time-frequency resources allocated by the base station in an uplink grant free (UL GF) resource period; determine available time-frequency resources configurable to transmit uplink data within the UL OF resource period when the number of the time-frequency transmission resources on which the transmission direction conflict occurs being less than a preset value; and transmit uplink data on the available time-frequency resources;

transmitting uplink data on the available time-frequency resources; refusing to transmit uplink data on any one of the time-frequency transmission resources within the UL GF resource period when the number of the time-frequency transmission resources on which the transmission direction conflict occurs being greater than or equal to the preset value.

12. A non-transitory computer-readable storage medium having stored instructions that, when executed by the processor, implementing operations of receiving transmission directions of time domain symbols, the transmission directions of the time domain symbols being indicated by a base station via SlotFormat indication (SFI) information through a group common physical downlink control channel (group common PDCCH); determining, based on the transmission directions of the time domain symbols, time-frequency transmission resources on which transmission direction conflict occurs, wherein the time-frequency transmission resources are time-frequency resources allocated by the base station in an uplink grant free (UL GF) resource period; determining available time-frequency resources configurable to transmit uplink data within the UL GF resource period when the number of the time-frequency transmission resources on which the transmission direction conflict occurs being less than a preset value; and transmitting uplink data on the available time-frequency resources;

transmitting uplink data on the available time-frequency resources; refusing to transmit uplink data on any one of the time-frequency transmission resources within the UL GF resource period when the number of the time-frequency transmission resources on which the transmission direction conflict occurs being greater than or equal to the preset value.

* * * * *